(12) United States Patent
Uemura et al.

(10) Patent No.: US 6,267,890 B1
(45) Date of Patent: *Jul. 31, 2001

(54) METHOD OF OPERATING SPIRAL WOUND TYPE MEMBRANE MODULE

(75) Inventors: Keiji Uemura; Hirotake Shigemi, both of Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/341,047

(22) PCT Filed: Nov. 6, 1998

(86) PCT No.: PCT/JP98/05001

§ 371 Date: Jul. 1, 1999

§ 102(e) Date: Jul. 1, 1999

(87) PCT Pub. No.: WO99/24154

PCT Pub. Date: May 20, 1999

(30) Foreign Application Priority Data

Nov. 7, 1997 (JP) .................................................... 9-305610

(51) Int. Cl.$^7$ .................................................. B01D 61/00
(52) U.S. Cl. ............................................................. 210/650
(58) Field of Search ........................ 210/321.75, 321.76, 210/321.84, 321.85, 493.4, 497.1, 321.74, 321.83, 650, 652

(56) References Cited

U.S. PATENT DOCUMENTS 4,814,079   3/1989   Schneider .
5,069,780  12/1991   Thalmann et al. .
5,460,720  10/1995   Schneider .
5,858,229 * 1/1999   Uemura et al. .

FOREIGN PATENT DOCUMENTS

| 0 347 174 | 12/1989 | (EP) . |
| 0 819 466 | 1/1998 | (EP) . |
| 54-32179 | 3/1979 | (JP) . |
| 54-167863 | 11/1979 | (JP) . |
| 59-179110 | 10/1984 | (JP) . |
| 5-208120 | 8/1993 | (JP) . |
| 10-43552 | 2/1998 | (JP) . |

* cited by examiner

*Primary Examiner*—Ana Fortuna
*Assistant Examiner*—Richard W. Ward
(74) *Attorney, Agent, or Firm*—Kanesaka & Takeuchi (57) ABSTRACT

A spiral wound type membrane module is formed of a plurality of membranes wound about an axis of the module to form a roll of the membranes and to form feed water channels between the membranes into which feed water flows via a front end of the roll and from which nonpermeated water flows out via a rear end of the roll, wherein the module is operated such that a differential pressure between the feed water flowing into the channels and the nonpermeated water flowing out from the channels is 0.3 kg/cm$^2$ or less. The pressure of the feed water is kept at $P_{Fmax}$ or an approximate value of $P_{Fmax}$ which brings a maximum permeate flux at the moment when a predetermined period has passed after starting to supply the feed water into the membrane module continuously at a constant pressure.

9 Claims, 6 Drawing Sheets

FIG.8

METHOD OF OPERATING SPIRAL WOUND TYPE MEMBRANE MODULE

FIELD OF THE INVENTION

The present invention relates to a method of operating a spiral wound type membrane module used in a membrane separation device including a microfiltration device, ultrafiltration device, and reverse osmosis membrane separation device.

BACKGROUND OF THE INVENTION

As a membrane module used for a membrane separation device, there has been known a spiral wound type membrane module in which separation membranes are wound around the outer circumference of a water collection pipe.

Figure 5:
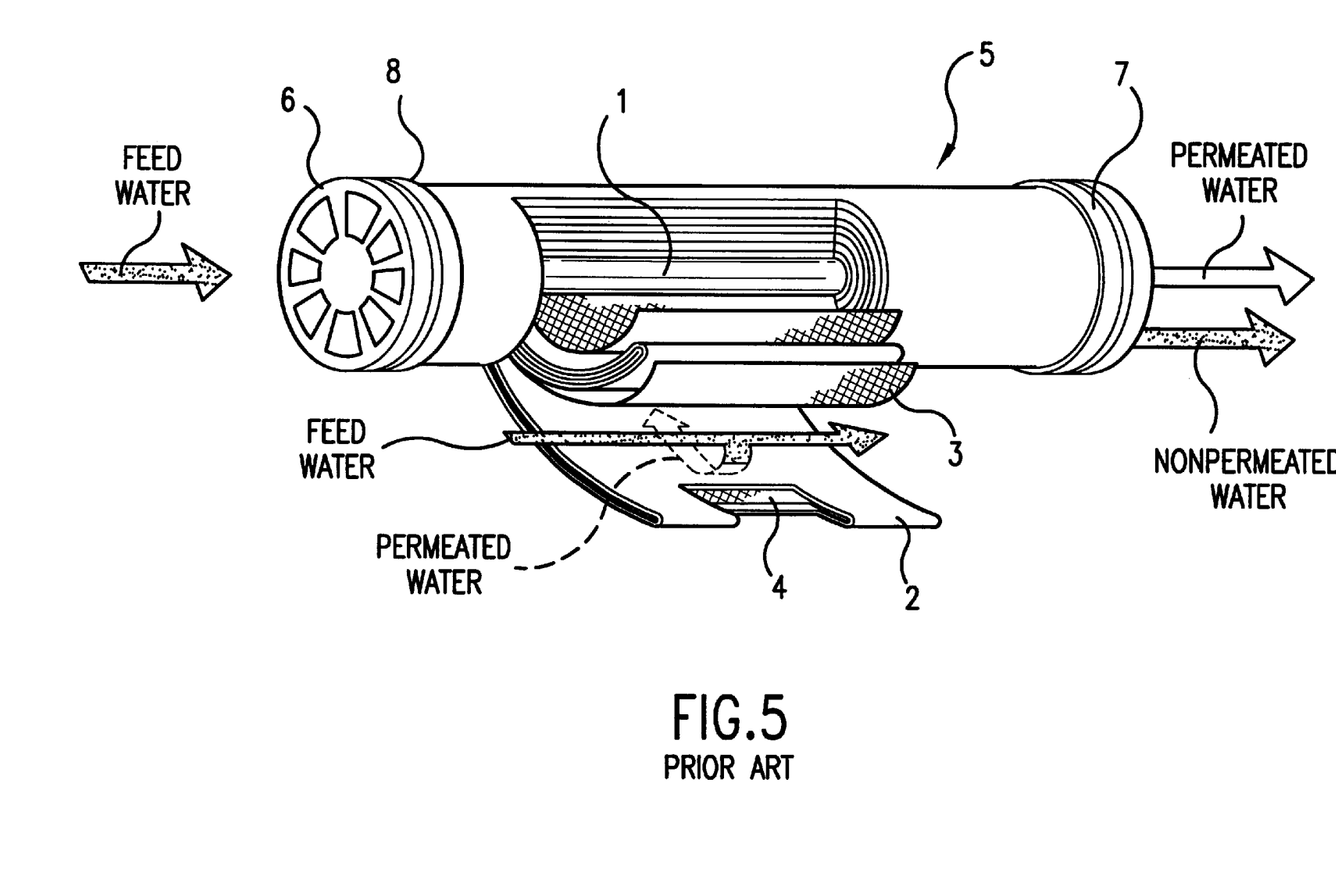
FIG. 5 is a perspective view showing the structure of a conventional spiral wound type membrane module.

FIG. 5 is a perspective view, partly exploded, showing a structure of a conventional spiral wound type membrane module.

A plurality of envelope-shaped membranes 2 having a shape of an envelope are wound onto a water collection pipe 1 with mesh spacers (outer spacers) 3 being interposed between the membranes.

The water collection pipe 1 is provided with a slit-like opening for allowing communication between the outside and the inside of the pipe. Inside of the membrane 2 formed in an envelope shape, communicates with the inside of the water collection pipe 1. Inserted into each envelope-shaped membrane 2 is an inside spacer 4 including mesh-like spacer, for forming a channel inside the membrane, so that the inside of the envelope-shaped membrane (hereinafter, sometimes referred to as just "membrane") 2 constitutes a permeated water channel.

The opposite ends of a roll 5 of the membranes 2 are closed with a top ring 6 and an end ring 7 at its edges and brine seals 8 are fitted around the top ring 6 and the end ring 7.

Feed water (raw water) flows from the front end of the membrane roll 5 into a feed water channel(raw water channel) between the membranes 2 and further flows in the longitudinal direction of the membrane roll 5. Nonpermeated water is outputted from outlets of the rear end of the membrane roll 5. While the water passes in the feed water channels, the water permeates through the membranes 2 and flows into the pipe 1 and is taken out from the rear end of the pipe 1 as permeated water.

The spiral wound type membrane module is easily clogged and it is difficult to operate in such a manner to keep a flux of the permeated water at a high rate for a long period.

The conventional spiral wound type membrane module has also the following defects:

1) The water collection pipe 1 must have larger diameter to obtain a great flux within the pipe 1. However, this also makes the diameter of the spiral wound type membrane module larger.

2) The permeated water flows in each membrane spirally to the water collection pipe 1, so that a flow resistance increases in the membrane. A flow resistance is also high around the slit-like openings through which the permeated water flows from the inside of the membrane 2 into the water collection pipe 1.

3) A volume of the feed water flowing in the feed water channels decreases as the feed water flows to the outlet by permeation into the membranes, and a flow velocity of the feed water becomes small in a downstream region of the feed water channels whereby the membranes are easy to be fouled therearound.

OBJECT AND SUMMARY OF THE INVENTION

It is an object of the present invention to provide a method of operating a spiral wound type membrane module capable of producing permeated water at a high rate.

It is another object of the present invention to provide an improved method of operating a spiral wound type membrane module which has a roll of a membrane wound spirally and is improved in such a manner to separate feed water into permeated and nonpermeated water by supplying the feed water between the membranes.

The module is operated, according to the present invention, such that a differential pressure between the feed water flowing into feed water channels and the nonpermeated water flowing out from the channels is 0.3 kg/cm$^2$ or less, particularly 0.15 kg/cm$^2$ or less, more particularly 0.10 kg/cm$^2$ or less.

In the method of operating the spiral wound type membrane module of the present invention, as the differential pressure across the permeating process (the above differential pressure between the feed water and the nonpermeated water) is suitable, the permeate flux is kept at a relatively high rate for a long period and the feed water is membrane-separated efficiently for the total running time.

In one embodiment of the present invention, the spiral wound type membrane module has envelope-shaped membranes, a permeated water spacer for forming permeated water channels disposed inside each envelope-shaped membrane and a feed water spacer for forming feed water channels disposed between the membranes. Each membrane may be formed in a substantial rectangle having first, second, third and fourth sides. The first, second and third sides are closed and the fourth side is partly opened to have an opening and closed at the rest thereof to have a blocking portion. The membranes are wound onto a shaft of the module to form a membrane roll in such a manner that the first sides perpendicular to the fourth sides are in contact with the shaft and the fourth sides are exposed on the rear end of the membrane roll, and the second sides opposite to the fourth sides are exposed on the front end of the membrane roll. Each feed water channel between the membranes is closed along the entire of the third side, closed to have a blocking portion along a portion of the fourth side corresponding to the opening of the membrane, and opened to have an opening along a portion of the fourth side corresponding to the blocking portion of the membrane.

In the thus constituted spiral wound type membrane module, raw water flows from the front end of the roll into the feed water channels. The raw water flows in the feed water channels in a direction substantially parallel to the axis of the membrane roll and is taken out as nonpermeated water from the openings of the feed water channels on the rear end of the roll.

Water permeated through the membranes flows in the membranes in a direction substantially parallel to the axis of the roll and is taken out from the opening formed on the rear end of the roll.

Since the permeated water flows in the membranes in the direction parallel to the axis of the roll as mentioned above, a water collection pipe used in a conventional spiral wound type membrane module is no longer necessary. This can avoid the flowing resistance of the water when flowing from the membranes into the water collection pipe, thereby significantly reducing the flowing resistance of the permeated water.

As the water collection pipe can be eliminated, the length of the membrane in the winding direction can be increased so as to increase the membrane area. Even with the membrane having increased length in the winding direction, the flowing resistance of the permeated water is not grown up. This allows greater flux to be obtained.

Each feed water channel is opened just along a portion of the rear end of the roll so that the flow rate of feed water (nonpermeated water) at the downstream of the feed water channel can be higher than that of the conventional one, thereby also preventing the fouling at the downstream of the feed water channel.

In one embodiment of the invention, the openings of the membranes are positioned in one of outside and inside annular portions of the rear end of the roll, and the openings of the feed water channels are positioned in the other portion of the rear end of the membrane roll. A ring member is connected to the rear end of the roll for separating permeated water flowing out from the openings of the membranes and nonpermeated water flowing out from the openings of the feed water channels. The ring member defines the rear end of the roll to distinguish an outlet area for permeated water from an outlet area for nonpermeated water.

BRIEF DESCRIPTION OF THE DRAWINGS

FIG. 1b is a sectional view taken along the line 1b—1b of FIG. 1a;

FIG. 1c is a sectional view taken along the line 1c—1c of FIG. 1a;

DESCRIPTION OF THE PREFERRED EMBODIMENTS

Figure 6A:
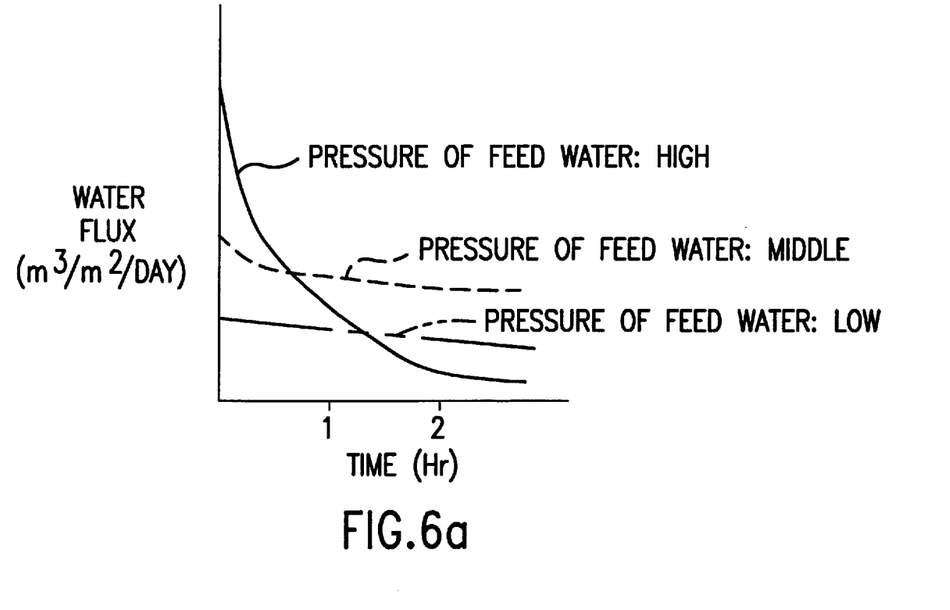
FIGS. 6a and 6b are diagrams illustrating characteristics of the spiral wound type membrane module in operations.

A volume of the permeated water (a permeate flux) is determined with time on a condition that the feed water was supplied continuously while keeping pressures of the feed water and the nonpermeated water substantially equal. The followings are found as a result thereof:

i) The water flux is high initially when the pressure of the feed water flowing into the channels is high, but the membranes are easy to be fouled (especially in an area near the inlet of the feed water where the differential pressure is extremely high and the flux is so high that the membranes are fouled rapidly) whereby the entire flux of the module reduces remarkably within a short period of time also as shown in FIG. 6a. When the back pressure applied to the permeated water is almost zero, the pressure of the feed water is practically the same as a differential pressure across the permeation (that is the differential pressure between the feed water and the nonpermeated water) per unit area thereof.

ii) When the pressure of the feed water is medium, the initial flux and the permeating pressure drop are both medium, and the flux decreases with time relatively slower than when the differential pressure is high.

iii) When the pressure of the feed water is low, the flux decreases slowly with time, though the initial flux is quite a little.

Figure 6B:
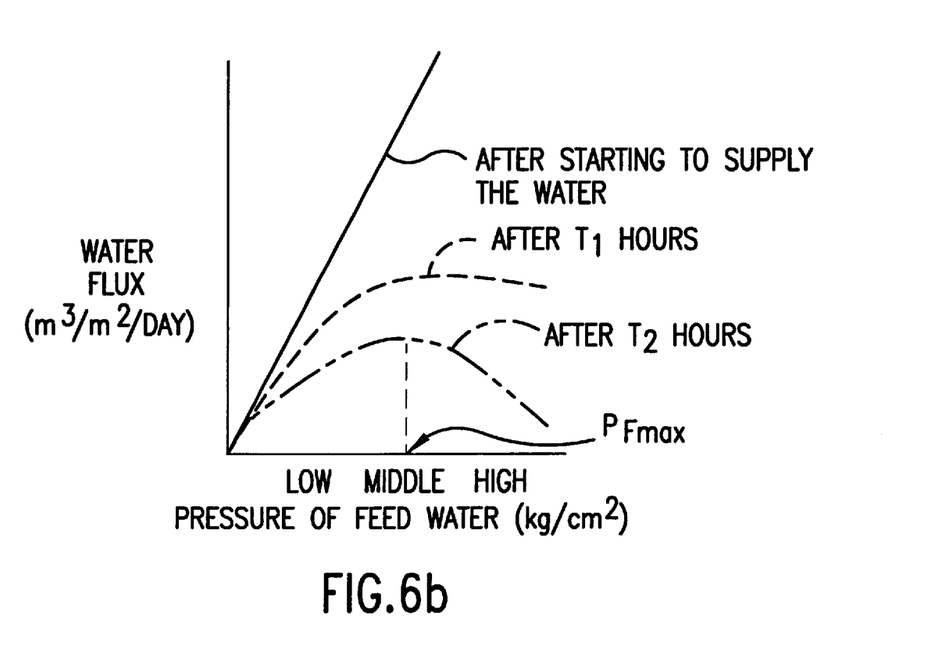

FIG. 6a uses the time for a horizontal axis, the permeate flux for a vertical axis and the pressure of the feed water for a parameter, and FIG. 6b uses the pressure of the feed water for a horizontal axis, the permeate flux for a vertical axis and the time for a parameter. The followings are found from FIGS. 6a and 6b:

iv) A substantially linear proportional relationship exists between the pressure of the feed water and the permeate flux. As the pressure of the feed water increases, the permeate flux also increases linearly immediately after starting to supply water as shown in FIG. 6b. However, as time elapses, the permeate flux comes to decrease and the rate of the decrease of the permeate flux rises corresponding to increasing of the pressure of the feed water.

v) At the moment when a certain period of time $T_1$ has passed, the permeate flux scarcely changes in a region where the pressure of the feed water is in a range from middle to high.

vi) At the moment when a certain period of time $T_2$ longer than $T_1$ has passed, the permeate flux decreases corresponding to increasing of the pressure of the feed water in a region where the pressure of the feed water is in a range from middle to high.

vii) The permeate flux increases corresponding to increasing of the pressure of the feed water despite the elapse of time in a region where the pressure of the feed water is in a range from middle to high.

viii) Therefore, the relatively high permeate flux can be obtained for a long period of time due to the pressure of the feed water in a middle range.

The above middle range comprises a value of the pressure which carries a maximum permeate flux on a curve of a graph having an upper convex shape as illustrated in FIG. 6b where the period of time $T_2$ has passed. In the present invention, the pressure of the feed water is taken as the above middle range so as to maintain the permeate flux at a relatively high rate for a long period. The pressure of the feed water is preferable to be in a range of 70 to 130% of $P_{Fmax}$ which brings a maximum permeate flux, particularly in a range of 80 to 120% of $P_{Fmax}$, more particularly in a range of 90 to 110% of $P_{Fmax}$.

The period of time $T_2$ can be arbitrarily selected from a range of time where a curve illustrating the relationship between the permeate flux and the pressure of the feed water takes an upper convex shape as shown in FIG. 6b, and $T_2$, for example, is preferable in a range from 1 minute to 2 hour, particularly in a range from 0.1 to 1 hour.

The above middle range of the pressure of the feed water varies depending on quality and temperature of water and materials of membranes. The middle range can be determined by feeding water to be permeated into the membrane module, by defining the relationship between the pressure of the feed water (the differential pressure across the permeation) and the permeate flux, and by drawing a graph which employs the pressure of the feed water for a horizontal axis and the permeate flux for a vertical axis as shown in FIG. 6b.

In the actual operation, after flowing for an elapse of time $T_2$, the feed water is stopped to flow into the module at first for a short period (normally for 0.5 to 1 minutes) for backwash, and then the feed water is started to flow into the module again for another elapse of time $T_2$, and the cycle is repeated. Therefore, the curve at the moment when the period of time $T_2$ has passed as shown in FIG. 6b illustrates the minimum permeate flux in a operation cycle.

The spiral wound type membrane module having a roll of membranes wound spirally is contained within a cylindrical pressure-resistant container coaxially. The feed water is led into the pressure-resistant container from one end thereof and flows into the feed water channel of the membrane module from the front end thereof.

The nonpermeated water flows out from at least one of a circumference and a rear end of the module and is taken out from a port for taking out the nonpermeated water of the pressure-resistant container. In a preferable embodiment of the present invention, the permeated water comes out from the rear end of the membrane module and is taken out from a port for taking out the permeated water of the pressure-resistant container.

An outlet valve for the nonpermeated water may be provided at an outlet port of the container or a pipe connected to the port so that the pressure of the nonpermeated water flowing out from the membrane module within the pressure-resistant container can be regulated due to adjusting the opening of the valve.

An outlet valve for permeated water may not be provided at an outlet port for the permeated water or a pipe connected to the port. Even when the valve for the permeated water is provided, the pressure of the permeated water flowing out from the membrane module within the pressure-resistant container is almost the same as the atmospheric pressure due to almost full open of the valve. Therefore, the back pressure is scarcely applied to the permeated water in the permeated water channel within the membrane module.

In the present invention, when the differential pressure across the membranes is precisely or almost $P_{Fmax}$ (expressed in FIG. 6b) at any portion on a surface of the membranes, the permeate flux can be kept high for a long period in the whole area of the membranes.

When the back pressure is scarcely applied to the permeated water, the pressure of the permeated water is almost the same as the atmospheric pressure in membrane module and the differential pressure across the membranes is almost the same as the pressure of the feed water contacting with the membrane. Therefore, the differential pressure across the membranes becomes substantially the above $P_{Fmax}$ over the whole area of the membrane when the feed water flowing in the feed water channel in the membrane module is prevented from pressure fall.

In the present invention, the differential pressure between the feed water flowing into the membrane module and the nonpermeated water flowing out from the membrane module is kept in a very small value so as to equalize the pressure of the feed water over the whole area of the membranes. As a result thereof, the differential pressure across the membrane can be kept at almost $P_{Fmax}$ over the whole area of the membrane.

In the present invention, the differential pressure between the feed water and the nonpermeated water is preferably 0.3 kg/cm² or less, particularly 0.15 kg/cm² or less, more particularly 0.10 kg/cm² or less.

The above description will clearly shows the reason why the permeate flux is maintained at a high rate for a long period when the pressure of the feed water is substantially taken as $P_{Fmax}$ preferably taken as a value in a range of 70 to 130% of $P_{Fmax}$ and the differential pressure between the feed water and the nonpermeated water is taken as 0.3 kg/cm² or less.

The differential pressure between the feed water and the nonpermeated water can be kept at 0.3 kg/cm² or less when the opening of the outlet valve for the nonpermeated water is made small sufficiently and the membrane module has a small loss of the pressure of the feed water.

Figure 1A:
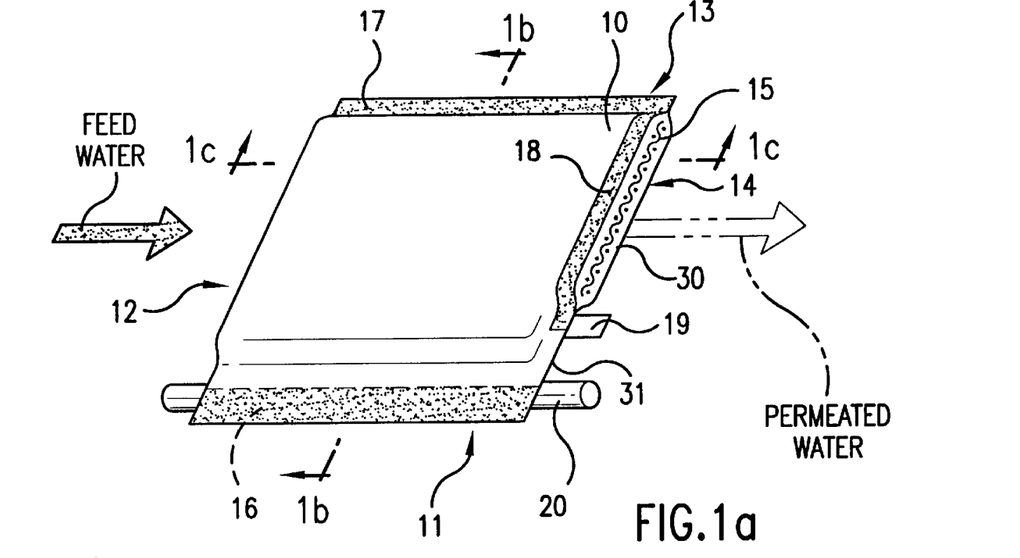
FIG. 1a is a perspective view showing one of envelope-shaped membranes according to an embodiment.
Figure 1B:
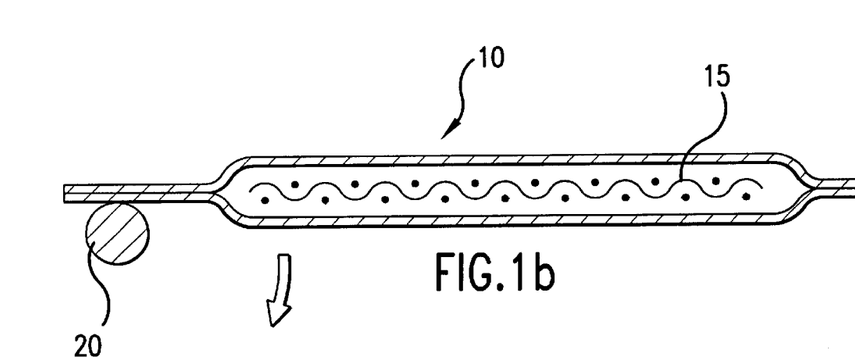
Figure 1C:
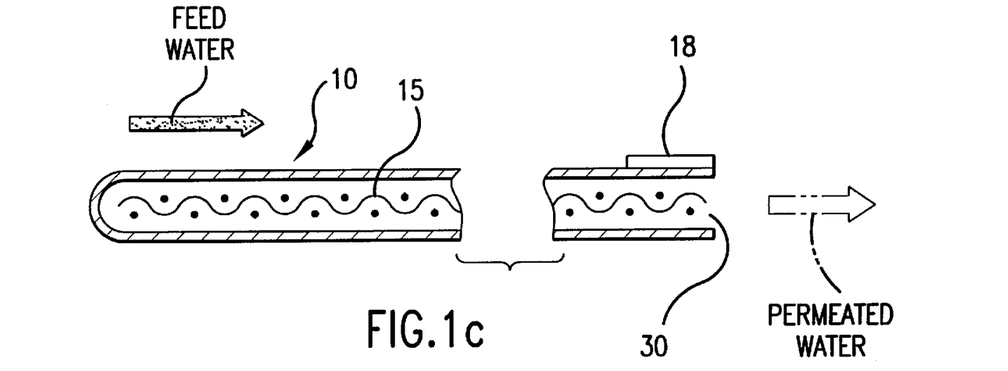
Figure 2:
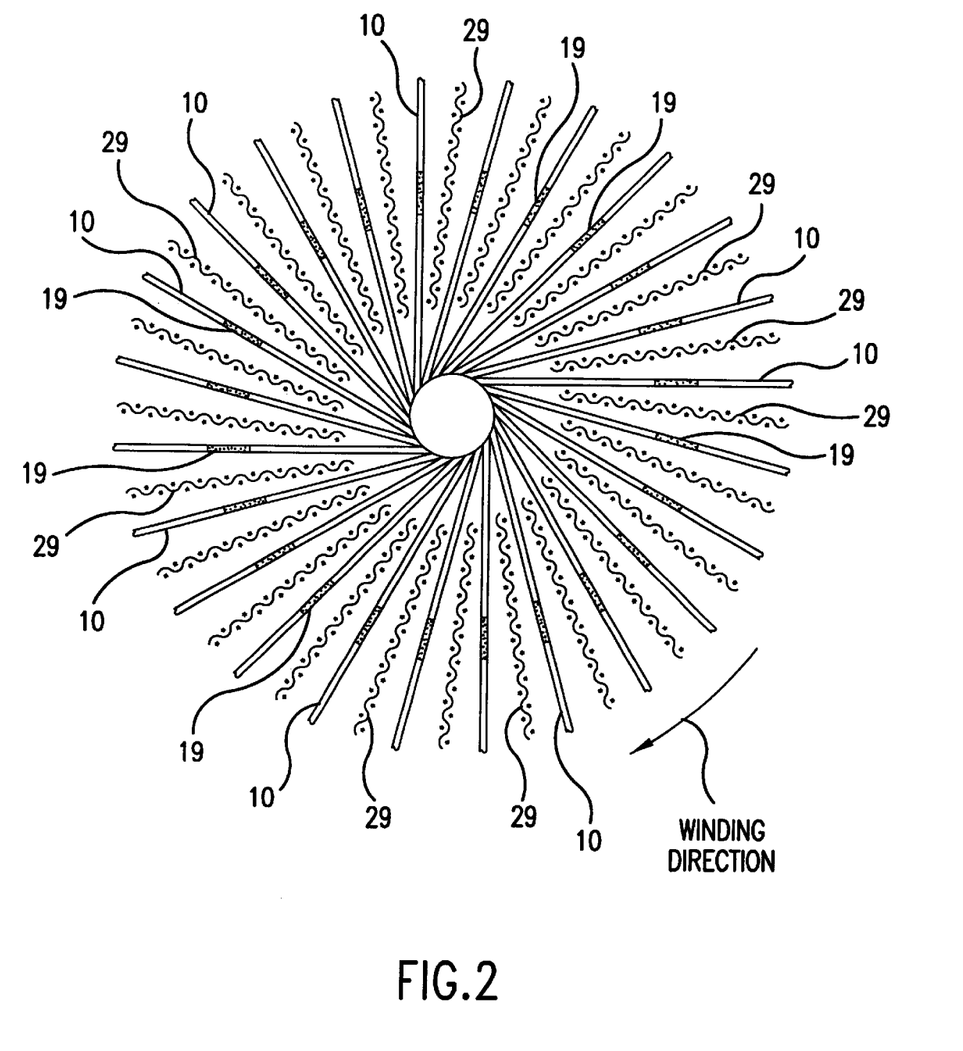
FIG. 2 is a sectional view illustrating a way of winding the membranes of a spiral wound type membrane module according to the embodiment.
Figure 3:
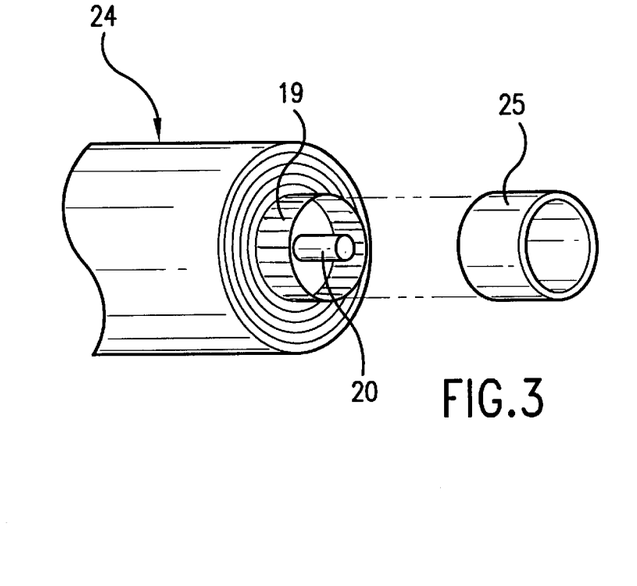
FIG. 3 is a perspective view showing the engagement between the membrane roll and a socket.
Figure 4:
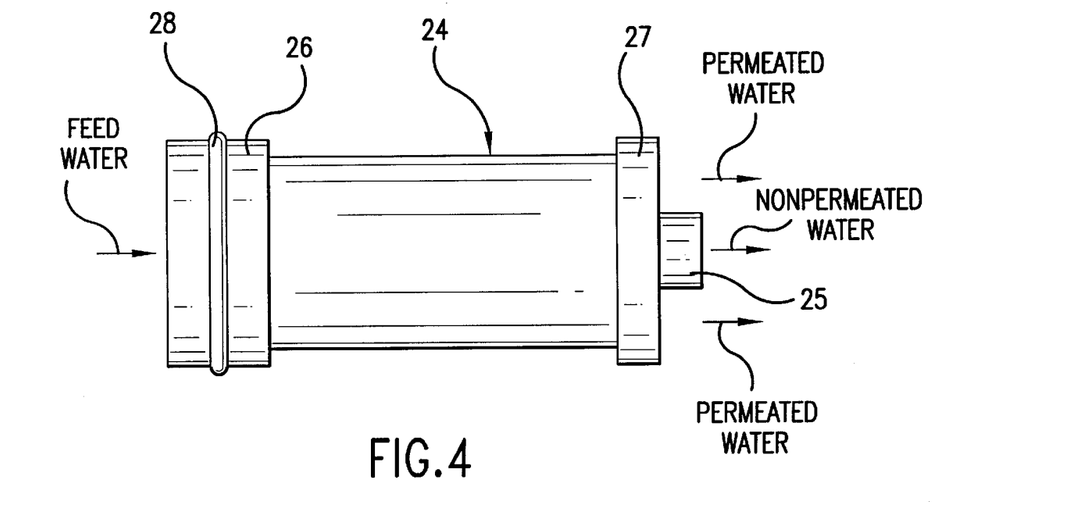
FIG. 4 is a side view of the spiral wound type membrane module according to the embodiment.

Hereinafter, preferable embodiments of the membrane module of the present invention will be described with reference to attached FIG. 1 through FIG. 4. FIG. 1a is a perspective view showing one of envelope-shaped membranes and a shaft onto which the membranes are wound, which are used in a spiral wound type membrane module of an embodiment of the present invention. FIGS. 1b and 1c are sectional views taken along line 1b—1b and line 1c—1c of FIG. 1a, respectively. FIG. 2 is a sectional view illustrating a way of winding the membranes around the circumference of the shaft, FIG. 3 is a perspective view showing the engagement between the membrane roll and a socket, and FIG. 4 is a side view of the spiral wound type membrane module.

Each envelope-shaped membrane 10 according to this embodiment is formed in a square or rectangle having a first edge 11, a second edge 12, a third edge 13 and a fourth edge 14. The membrane 10 comprises a long sheet of a membrane film which is folded at the second edge 12 into two halves which are bonded to each other along the first edge 11 and the third edge 13 with adhesives and are not bonded to each other to have an opening along a part of the fourth edge 14 to form an envelope shape.

The halves of the membrane film are not bonded to each other along a part of the fourth edge 14 from a halfway of the fourth edge 14 to the third edge 13 to form an outlet 30 for permeated water. The halves of the membrane film are bonded to each other along a rest of the fourth edge 14 from the halfway of the fourth edge 14 to the first edge 11 so as to form a blocking part 31 for blocking the flow of the permeated water.

Disposed inside the membrane 10 is a spacer (for example, a mesh spacer) 15 for forming a channel or permeated water channel inside the membrane 10. Instead of a sheet of membrane film 10 which is folded at the second edge 12 into two halves, two membrane films may be used. In this case, the membrane films are bonded along the first edge 11, the second edge 12, the third edge 13, and a part of the forth edge 14 to each other.

Adhesive 16 is applied to one surface of the membrane 10 and adhesives 17, 18 are applied to the other surface of the membrane 10. A plurality of such membranes 10 is wound around the circumference of a shaft 20 to form a membrane roll. The adhesive 11 is applied along the first edge 16 and the adhesive 17 is applied along the third edge 13. The adhesive 18 is applied from the halfway of the fourth edge 14 to the third edge 13 along the outlet 30 for permeated water.

Upon winding the plurality of membranes 10 onto the shaft 20, the membranes 10 superposed on each other are watertightly bonded to each other at portions where the adhesives 16, 17, 18 are applied. Therefore, a water channel where the feed water and nonpermeated water flow is formed between every adjacent two of the membranes 10, 10. As the adhesive 18 sets, on the rear end of the membrane roll, an outlet for raw water (nonpermeated water) is formed inside and a blocking part for blocking the flow of raw water is formed outside.

Each fin 19 is disposed in the fourth edge 14 to extend backward from a boundary between the outlet 30 for permeated water and the blocking part 31 for blocking the flow of permeated water. The fin 19 may be made of a synthetic resin film or sheet and is preferably bonded to the membrane 10 with adhesives.

The membranes 10 are wound around the circumference of the shaft 20 by way of mesh spacers 29 as shown in FIG. 2 so as to form the membrane roll 24 as shown in FIG. 3. The fins 19 project from the rear end of the roll 24. The fins 19 are disposed at the same portions on the fourth edges 14 of the respective membranes 10 in such a manner that the fins 19 are positioned apart from the axis of the roll 24 at the same distance in the radial direction and the fins 19 are partly superposed on each other so as to constitute a ring-like protrusion. Inserted into the ring-like protrusion is the rear end of a cylindrical socket 25. The socket 25 and the fins 19 are then bonded to each other by adhesives. The socket 25 may be fitted to the outside of the protrusion made by the fins 19. Instead of the fins 19, the roll 24 may be provided with a slit formed at a portion corresponding to the fins 19 by a lathe and the socket 25 may be embedded into the slit.

The socket 25 and the fins 19 are bonded to each other so that the rear end of the roll 24 is divided into an outlet area for permeated water outside the socket 25 and an outlet area for nonpermeated water inside the socket 25.

Before winding the membranes 10 onto the shaft 20, mesh spacers 29 are disposed between the membranes 10 as shown in FIG. 2. By disposing the mesh spacers 29 between the membranes 10, the feed water channel is formed.

As shown in FIG. 4, a top ring 26 and an end ring 27 are formed at both ends of the roll 24 by synthetic resin molds or the like and brine seal 28 is fitted to the periphery of the top ring 26.

In the thus constituted spiral wound type membrane module, feed water is supplied from the front end of the roll 24 into the feed water channel between the membranes 10 as shown in FIG. 4. The feed water flows in the channel in the direction almost parallel to the axis of the roll 24 and is then taken out from the area inside the socket 25 at the rear end of the roll 24. While the feed water flows in the feed water channels in this manner, water permeates through the membranes 10 so that the permeated water is taken out from the area outside the socket 25 at the rear end of the roll 24.

The feed water flows into the module with the pressure of almost $P_{Fmax}$, preferably in a range from 70 to 130% of $P_{Fmax}$ more particularly in a range from 80 to 120% of $P_{Fmax}$ and most particularly in a range from 90 to 110% of $P_{Fmax}$. The feed water flows through the module in such a manner that a differential pressure ΔP between the feed water and the nonpermeated water is kept at 0.3 kg/cm$^2$ or less, preferably 0.15 kg/cm$^2$ or less, more preferably 0.10 kg/cm$^2$ or less. The back pressure applied to the nonpermeated water flowing out from the module is preferable to be as small as possible.

The permeate flux can be maintained at a high rate even when a long period of time has passed after starting the operation as shown in FIGS. 6a, 6b due to selecting the pressure of the feed water and minimizing the differential pressure between the feed water and the nonpermeated water. Therefore, the high permeate flow can be obtained due to reducing the frequency of backwash to perform the efficient membrane separation process.

Figure 7:
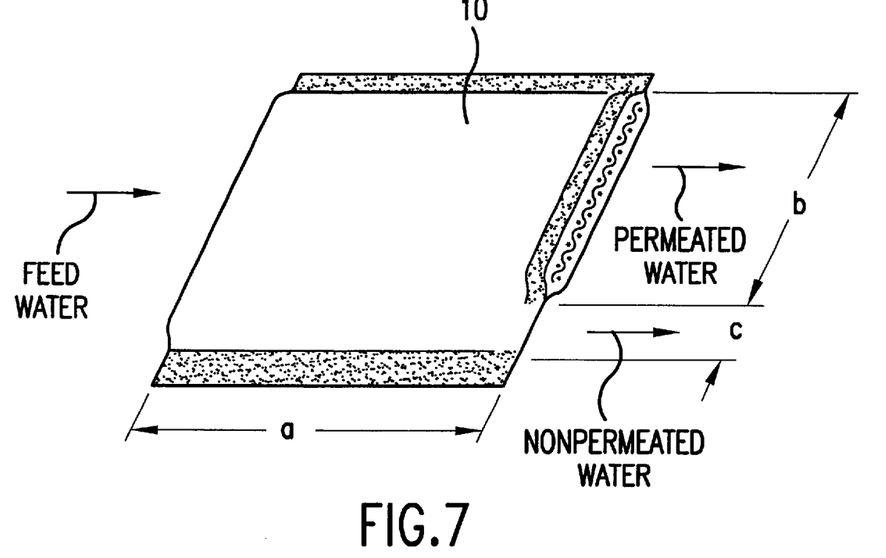
FIG. 7 is a dimension diagram of an envelope-shaped membrane.

It was found that a length "a" of the membranes 10 in an axial direction as shown in FIG. 7 is important to reduce the differential pressure ΔP. Namely, the range of "a" between 200 and 500 mm reduces the differential pressure ΔP. The membrane is preferable to be increased in its planar dimension by enlarging not along the length but along the radial direction. A length "b" of an area where the permeated water flows out and a length "c" of an area where the nonpermeated water flows out are preferably as follows:
b: 200 to 500 mm, more preferably 200 to 400 mm
c: 50 to 200 mm, more preferably 100 to 165 mm
a ratio of b/c: 2 to 4, more preferably 2 to 3
A ratio of (b+c)/a is preferably between 1.0 to 2.0 and more preferably between 1.0 to 1.5.

In this spiral module, since the permeated water flows through the membranes 10 in the direction parallel to the axis of the roll 24 and is taken out from the rear end, a water collection pipe used in a conventional spiral wound type membrane module is no longer necessary. Therefore, this can avoid flowing resistance of water when flowing from the membranes into the water collection pipe, thereby significantly reducing the flowing resistance of the permeated water. As a result thereof, the permeated water is scarcely applied with back pressure, and the pressure of the permeated water is almost equal to the atmospheric pressure.

As the water collection pipe can be eliminated, the length of the membrane 10 can be increased in the winding direction so as to increase the membrane area. Even with the membrane having increased length in the winding direction, the flowing resistance of the permeated water is not grown up. This allows greater flux to be obtained.

The outlet area for raw water is only positioned inside the socket 25. That is, the module has such a structure that the outlet of the feed water channel (i.e. the downstream) are narrowed. Therefore, high flow rate of feed water (nonpermeated water) is obtained even in the downstream of the feed water channel, thereby preventing the fouling at the downstream of the feed water channel. The areas inside and outside the socket 25 (the length of the adhesive 18 along the fourth edge 14) are preferably decided corresponding to the rate of permeated water collection in this spiral wound type membrane module.

Since the socket 25 is connected to the roll 24 by using the fins 19, the bond strength between the socket 25 and the roll 24 is high. The outlet area for permeated water and the outlet area for nonpermeated water are watertightly divided from each other by the socket 25.

Though the outlet area for permeated water is disposed outside the socket 25 and the outlet area for nonpermeated water is disposed inside the socket 25 in this embodiment, conversely the outlet area for permeated water may be disposed inside the socket 25 and the outlet area for nonpermeated water may be disposed outside the socket 25.

EXAMPLES

Example 1 i) An Operation for Determination of $P_{Fmax}$

The feed water is fed to a membrane module having a roll of membranes which are made of polytetrafluoroethylene and have constituents including a of 300 mm, b of 300 mm, c of 100 mm and b/c of 3 as shown in FIGS. 1 through 4. The membrane module is contained within a cylindrical pressure-resistant container. The feed water flows into the container from a front end thereof via a feed valve for the feed water. The nonpermeated water is taken out from a center portion of a rear end of the container and an outlet valve for the nonpermeated water. The permeated water is taken out through a takeoff pipe arranged in the proximity to a perimeter of the rear end of the container. The takeoff pipe doesn't have any valve.

Figure 8:
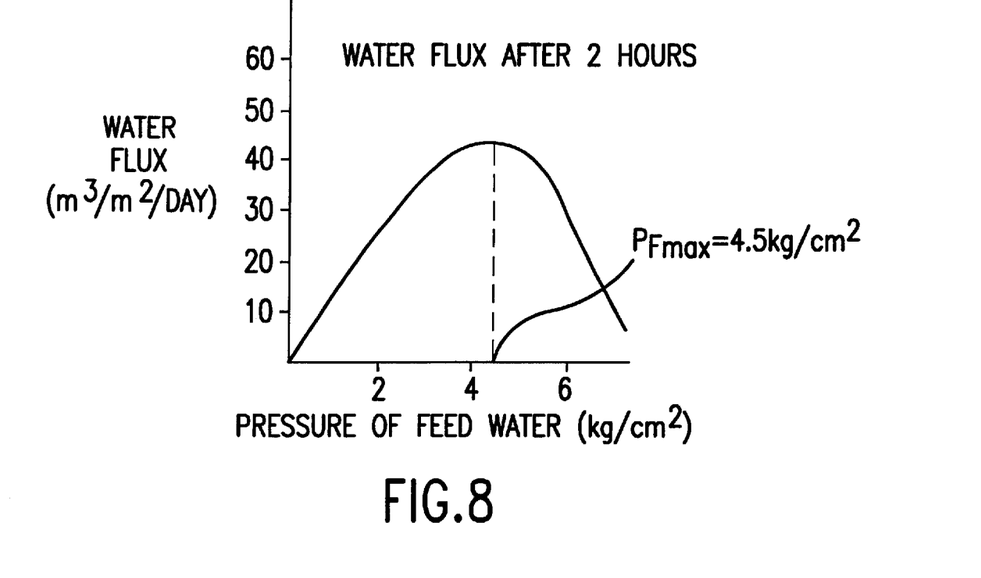
FIG. 8 is a diagram illustrating characteristics of the spiral wound type membrane module in operations according to Examples and Comparative Examples of an embodiment.

The feed water of tap water is supplied into the container to flow through the module at a pressure of 2 kg/cm² in a first operation, 4 kg/cm² in a second operation and 6 kg/cm² in a third operation to measure the permeate flux for two hours after starting the each operation. The results of the measurements are shown in FIG. 8 and $P_{Fmax}$ proves to be 4.5 kg/cm² according to FIG. 8. The period of time $T_2$ when a curve of the graph begins to form an upper convex curve is 1.5 hours.

ii) An Operation of the Module of

The pressure of the feed water is set to 4.5 kg/cm² due to adjusting the opening of the feed valve and the differential pressure between the feed water and the nonpermeated water is set to 0.10 kg/cm² due to throttling the outlet valve to reduce the flow rate of the nonpermeated water. The cycle consisting of 7.5 minutes' permeation and 30 seconds' backwash (one cycle totally spends 8 minutes) is repeated for 14 months. The feed water is supplied at a rate of 40 m³/m/day.

As a result, the permeated water is obtained constantly at a rate of 40 m³/m²/day for 14 months. The feed water is separated 98% into the permeated water and 2% into the nonpermeated water.

Comparative Examples 1

The feed water is supplied into the membrane module with the same membrane and the same condition as Example 1 except for the pressure of the feed water being set to 6 kg/cm² due to enlarging the opening of the feed valve and the differential pressure between the feed water and the nonpermeated water being set to 4 kg/cm² due to increasing the flow rate of the nonpermeated water by enlarging the opening of the outlet valve to reduce the pressure of the nonpermeated water. The rate of the permeate flux becomes 10 m³/m²/day at the moment when 24 hours have passed. Besides, the membrane is fouled rapidly and the permeate flux cannot recover despite repetition of backwash afterwards. Therefore, the operation cannot be continued beyond 24 hours.

Comparative Example 2

The feed water is supplied into the module with the same membrane and the same condition as Example 1 except for the pressure of the feed water being set to 0.7 kg/cm² due to throttling the feed valve and the differential pressure between the feed water and the nonpermeated water being set to 0.5 kg/cm² due to adjusting the opening of the outlet valve. The permeated water flux is kept at a rate of 2 m³/m²/day for 30 days. Although the membrane is not too fouled over 30 days, the permeate flux during the operation is extremely less as compared with Example 1.

As mentioned above, in the spiral wound type membrane module of the present invention, the drop in the permeate flux can be reduced and the high permeate flux can be obtained continuously.

What is claimed is:

1. A method of operating a spirally wound membrane module comprising a plurality of membranes wound about an axis of the module to form a roll of said membranes and to form feed water channels between said membranes into which feed water flows via a front end of the roll and from which nonpermeated water flows out via a rear end of the roll, the method comprising:

a) providing a module comprising a plurality of membranes having a form of an envelope, permeated water spacers for forming permeated water channels disposed inside the membranes, and feed water spacers for forming said feed water channels disposed between the membranes, wherein each of said plurality of membranes is formed in a substantial rectangle having first, second, third and fourth edges, the first, second and third edges being closed and a portion of the fourth edge being partially opened to define a permeated water opening, and closed at a rest thereof to form a blocking portion, wherein the membranes are wound upon a shaft of the module to form a membrane roll so that the first edges perpendicular to fourth edges are in contact with the shaft and the fourth edges are exposed on the rear end of the membrane roll, and the second edges opposite to the fourth edges are exposed on the front end of the membrane roll, and wherein each feed water channel between the membranes is closed entirely along the third edge, closed along a portion of the fourth edge corresponding to the permeated water opening, and opened along a portion of the fourth edge corresponding to said blocking portion to form a nonpermeated water opening; and b) passing feed water into said feed water channels of said membrane module such that permeated water flows out via said permeated water openings and such that nonpermeated water flows out via said nonpermeated water openings.

2. A method of operating a spirally wound module as claimed in claim 1, wherein the module is operated such that a differential pressure between the feed water flowing into the said channels and nonpermeated water flowing out from said channels is 0.3 kg/cm² or less.

3. A method of operating a spirally wound membrane module as claimed in claim 1, wherein said differential pressure between the feed water and the nonpermeated water is 0.15 kg/cm² or less.

4. A method of operating a spirally wound membrane module as claimed in claim 1, wherein said differential pressure between the feed water and the nonpermeated water is 0.10 kg/cm² or less.

5. A method of operating a spirally wound membrane module as claimed in claim 1, wherein the permeated water openings of the membranes are positioned in one of outside and inside portions of the rear end of the membrane roll and the nonpermeated water openings of the feed water channels are positioned in the other portion of the rear end of the membrane roll, and wherein said module further comprises a ring member, connected to the rear end of the roll, for separating the permeated water flowing out from the permeated water openings of the membranes and the nonpermeated water flowing out from the nonpermeated water openings of the feed water channels.

6. A method of operating a spirally wound module as claimed in claim 1, wherein for each of the plurality of membranes, the first edge is between 200 and 500 mm in length, the portion of the fourth edge partially opened to define a permeated water opening is between 200 and 500 mm in length, and the portion of the fourth edge corresponding to said blocking portion is between 50 and 200 mm in length.

7. A method of operating a spirally wound module as claimed in claim 6, wherein the portion of the fourth edge partially opened to define a permeated water opening is between 200 and 400 mm in length, and the portion of the fourth edge corresponding to said blocking portion is between 100 and 165 mm in length.

8. A method of operating a spirally wound module as claimed in claim 1, wherein for each of the plurality of membranes, a ratio between the length of the portion of the fourth edge partially opened to define a permeated water opening and the length of the portion of the fourth edge corresponding to said blocking portion is between 2 and 4.

9. A method of operating a spirally wound module as claimed in claim 1, wherein for each of the plurality of membranes, a ratio between a total length defined by the sum of the length of the portion of the fourth edge partially opened to define a permeated water opening and the length of the blocking portion of said fourth edge relative to the length of the first edge is between 1 and 2.

* * * * *